No. 670,546. Patented Mar. 26, 1901.
R. M. RUSSELL.
TOOL POST FOR LATHES.
(Application filed June 23, 1900.)
(No Model.)
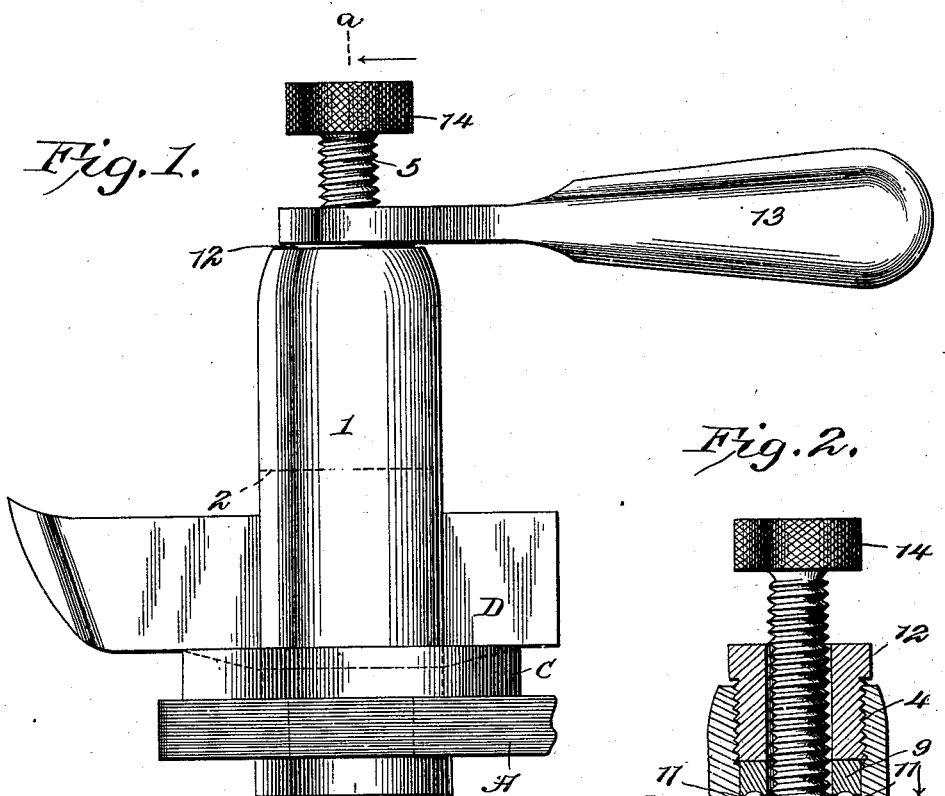
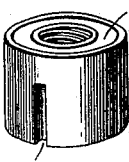
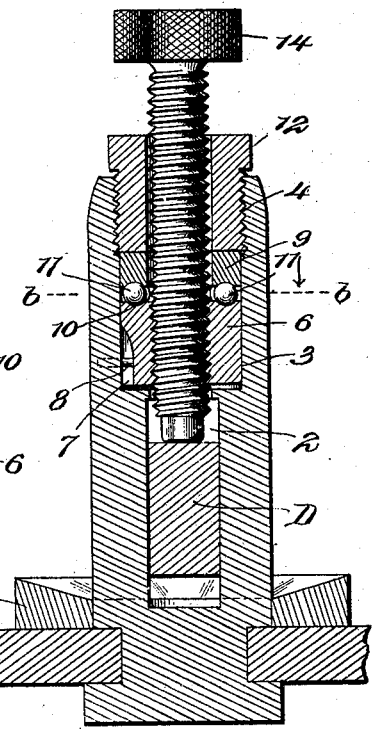
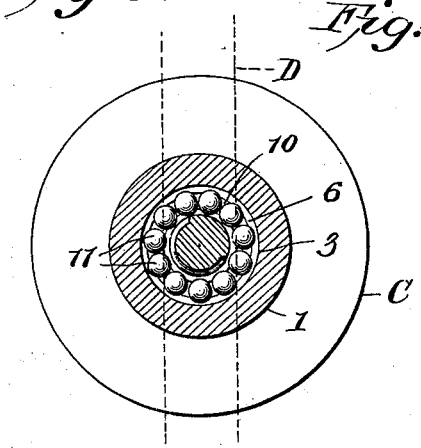
Witnesses
Howard D. Orr.
J. W. Garner
R. M. Russell, Inventor
by C. A. Snow & Co.
Attorneys
THE NORRIS PETERS CO., PHOTO-LITHO., WASHINGTON, D. C.

UNITED STATES PATENT OFFICE.

ROSS M. RUSSELL, OF BINGHAMTON, NEW YORK.

TOOL-POST FOR LATHES.

SPECIFICATION forming part of Letters Patent No. 670,546, dated March 26, 1901.

Application filed June 23, 1900. Serial No. 21,372. (No model.)

*To all whom it may concern:*

Be it known that I, ROSS M. RUSSELL, a citizen of the United States, residing at Binghamton, in the county of Broome and State of New York, have invented a new and useful Tool-Post for Lathes, of which the following is a specification.

My invention is an improved tool-post for lathes, one object of my invention being to provide improved means for tightening the tool-clamping screw.

A further object of my invention is to provide means for reducing friction between the tightening-plug and the nut which carries the tool-clamping screw.

My invention consists in the peculiar construction and combination of devices hereinafter fully set forth, and pointed out in the claims.

In the accompanying drawings, Figure 1 is a side elevation of a tool-post for lathes constructed in accordance with my invention. Fig. 2 is a vertical sectional view of the same, taken on the line *a a* of Fig. 1. Fig. 3 is a horizontal sectional view of the same, taken on the line *b b* of Fig. 2. Fig. 4 is a detail perspective view of the nut which carries the tool-clamping screw.

The lathe-carriage, a portion of which is indicated at A, is of the usual form. The tool-post 1 is secured to the lathe-carriage in the usual manner, and the usual annulus C, which supports the lower side of the tool D, surrounds the base of the tool-post. The latter has the usual transverse openings 2, through which the tool D passes.

The post 1 is provided in its upper portion with the bore 3, the upper portion of which bore is screw-threaded, as at 4. The tool-clamping screw 5 is carried by the cylindrical nut 6, which fits in the lower portion of the bore 3 of the tool-post and is provided on one side with a vertical groove 7, which is engaged by a pin 8, which projects into the bore 3. Thereby the cylindrical nut 6 is adapted to move vertically in the bore of the tool-post and is prevented from rotating therein. A ring 9 is disposed above the cylindrical nut 6 and is of the same diameter as the said cylindrical nut and fits snugly and is adapted to move vertically in the bore of the tool-post. The central opening of the ring 9, through which the tool-clamping screw passes, is of greater diameter than the clamping-screw, and the said ring is adapted to move on the said clamping-screw and is not engaged thereby. A ball-race 10 is formed in the opposing sides of the nut 6 and ring 9, and bearing-balls 11 are disposed in the said ball-race, whereby friction between the ring 9 and the cylindrical nut 6 is reduced to the minimum, as will be understood.

The tightening-plug 12, which is screwed into the threaded upper portion of the bore of the tool-post, is provided with a handle 13, whereby it may be readily turned. If preferred, however, the said tightening-plug may be provided with an angular head and adapted to be turned by a suitable wrench. The tightening-plug does not engage the tool-clamping screw, the central bore of said tightening-plug being smooth and exceeding the diameter of the tool-clamping screw.

The operation of my invention is as follows: The cutting-tool being placed in the opening 2 of the tool-post and adjusted to the required position the tool-clamping screw 5 is turned by the milled head 14 thereof, so as to cause the tool-clamping screw to engage the upper side of the tool. The tightening-plug 12 is then turned by its handle 13 and caused to descend in the upper portion of the bore of the tool-post and bear downward on the cylindrical nut 6, which carries the tool-clamping screw, so as to tighten the latter and effectually clamp the tool in the opening 2 of the tool-post. The ball-bearing which is provided, as hereinbefore described, between the nut and the tightening-plug reduces friction between the same and increases the efficiency of the device, as will be understood. By unscrewing the tightening-plug 12 and lifting the same from the tool-post the tool-clamping screw, together with the ring 9, cylindrical nut, and bearing-balls, can be taken from the tool-post and kept assembled in their correct relative positions. The ball-bearing is hence readily accessible together with the other operative parts of the device.

Having thus described my invention, I claim—

1. The combination of the tool-post having the bore, smooth in its lower portion and with its upper portion screw-threaded, the nut located in the smooth lower portion of the bore, non-revoluble and adapted to play vertically therein, the tool-clamping screw, engaging and carried by the nut, and the tightening-plug screwed in the threaded portion of the bore, and adapted to depress the nut, substantially as described.

2. The combination of the tool-post having the bore, smooth in its lower portion and with its upper portion screw-threaded, the nut located in the smooth lower portion of the bore, non-revoluble and adapted to play vertically therein, the tool-clamping screw, engaging and carried by the nut, the tightening-plug screwed in the threaded portion of the bore, and adapted to depress the nut, the ring interposed in the smooth bore of the post, between the nut and the tightening-plug, and the bearing-balls in a race in the opposing sides of the said nut and ring, substantially as described.

In testimony that I claim the foregoing as my own I have hereto affixed my signature in the presence of two witnesses.

ROSS M. RUSSELL.

Witnesses:
ISRAEL T. DEYO,
D. L. FOLSOM.